United States Patent
Maier

[15] 3,694,467
[45] Sept. 26, 1972

[54] ANTHRAQUINONE DYES

[72] Inventor: Karl Maier, Ludwigshafen am Rhine, Germany

[73] Assignee: Badische Anilin- & Soda-Fabrik Aktiengesellschaft, Ludwigshafen am Rhine, Germany

[22] Filed: Feb. 19, 1970

[21] Appl. No.: 12,841

Related U.S. Application Data

[63] Continuation of Ser. No. 272,233, April 11, 1963, abandoned.

[30] Foreign Application Priority Data

April 19, 1962  Germany...................B 66 910

[52] U.S. Cl..........................................260/380, 8/39
[51] Int. Cl. .................................................C09b 1/54
[58] Field of Search.........................................260/380

[56] References Cited

UNITED STATES PATENTS 2,640,061   5/1953   Seymour et al............260/380

FOREIGN PATENTS OR APPLICATIONS 1,268,400   6/1961   France......................260/380
558,433   1/1944   Great Britain.............260/380

Primary Examiner—Lorraine A. Weinberger
Assistant Examiner—E. Jane Skelly
Attorney—Johnston, Root, O'Keeffe, Keil, Thompson & Shurtleff

[57] ABSTRACT

Anthraquinone dyes of the 1-amino-2-hydroxyalkoxy-4-hydroxyanthraquinone series, wherein the hydroxyalkoxy group contains four to nine carbon atoms, said dyes being useful for dyeing and printing synthetic fibers and plastics.

4 Claims, No Drawings

ANTHRAQUINONE DYES

This application is a continuation of my copending application, Serial No. 272,233, filed April 11, 1963 (now abandoned).

Dyes of the 2-alkoxyanthraquinone series have already been proposed for dyeing textile material of linear polyesters. Thus, it is known from U.S. Pat. No. 2,922,691 to use 2-alkoxyanthraquinones containing hydroxyl groups in α-position. Light fast and wet fast dyeings are obtained with such dyes on polyesters, but the dyeings have only moderate thermal fastness properties.

I have found that new dyes having the general formula:

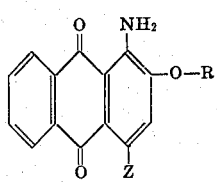

I in which Z denotes an amino or hydroxyl group and R denotes a hydroxyalkyl group having at least four carbon atoms and at least one hydroxyl group, and in which the anthraquinone radical may contain further substituents, for example halogen atoms, give on textile material of linear polyesters, dyeings and prints having very good to excellent fastness properties, particularly thermal fastness and fastness to light and to wet treatments.

The compounds having the general formula II:

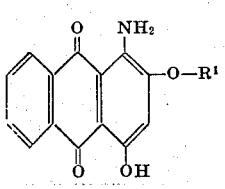

II in which $R^1$ denotes a hydroxyalkyl group having at least four and especially five up to nine carbon atoms and a primary hydroxyl group are preferred among the new dyes.

The new dyes of this invention may be obtained by reacting an anthraquinone derivative having the general formula III:

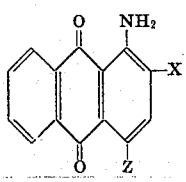

III in which X denotes an aryloxy group, a low molecular weight alkoxy group or a sulfonic acid group and Z denotes an amino group or hydroxyl group, and the anthraquinone radical may contain further substituents, for example halogen atoms, in the presence of an alkaline-reacting agent with an aliphatic polyalcohol containing at least four carbon atoms and at least one primary hydroxyl group, at temperatures of 120° to 170°C.

Examples of anthraquinone derivatives having the general formula III to be used for the process of this invention are 1-amino-2-phenoxy-4-hydroxyanthraquinone,
1-amino-2-(4-chlorophenoxy)-4-hydroxyanthraquinone,
1-amino-2-methoxy-4-hydroxyanthraquinone,
1,4-diaminoanthraquinone-2-sulfonic acid and
1-amino-4-hydroxyanthraquinone-2-sulfonic acid.

The anthraquinone derivatives may also contain further substituents, for example halogen.

Examples of polyalcohols containing at least four carbon atoms and at least one primary hydroxyl group are butanediol-(1,4), pentanediol-(1,5), hexanediol-(1,6), 2,2-dimethylpropanediol-(1,3), 2,2-diethylpropanediol-(1,3), 2-ethyl-2-n-butylpropanediol-(1,3), 2,2-dimethylhexanediol-(1,3), 2,2,4-trimethylpentanediol-(1,3), 1,1,1-trimethylolpropane, cis- and trans-hexahydroterephthalyl alcohol or mixtures of the same.

Examples of alkaline-reacting agents are alkali metal hydroxides or alkali metal alcoholates, such as potassium methylate, potassium ethylate or potassium tertiary butylate. The polyalcohols to be used according to this invention may also be used in the form of their alkali metal alcoholates.

Reaction of the anthraquinone derivatives of the abovementioned type which in 2-position bear an aryloxy or low molecular weight alkoxy group or a sulfonic acid group with the aliphatic polyalcohols and the alkaline-reacting agents of the abovementioned type may be effected by conventional methods by heating the components to temperatures of 120° to 170°C, preferably of 140° to 160°C. As a rule, an excess of the polyalcohol of the said type of twice to four times by weight with reference to the anthraquinone component is used. The component used in excess serves at the same time as a solvent or diluent during the reaction. In some cases it may be of advantage in the reaction to add solvents and diluents which do not themselves react under the conditions of the reaction, as for example hexanediol-(2,5). The reaction is over after a few hours, usually after 2 to 10 hours.

The process according to this invention may also be carried out by using, instead of an anthraquinone derivative bearing in 2-position an aryloxy group of the abovementioned type, a mixture of an anthraquinone derivative of the abovementioned type bearing in 2-position a halogen atom and a phenol. Under the conditions of the reaction, a 2-aryloxyanthraquinone is probably formed intermediately. In this reaction, phenol is used in an amount by weight about equal to that of the anthraquinone component. A slight excess of the alkaline-reacting agent beyond that required to bind the hydrogen halide set free is used.

Examples of anthraquinone derivatives which in 2-position bear halogen atoms are: 1-amino-2-bromo-4-hydroxyanthraquinone and 1,4-diamino-2-bromoanthraquinone. Suitable phenols are phenol itself or chlorophenol.

The dyes obtainable according to the process of the invention are suitable for dyeing and printing synthetic fibers and plastics and may be used as mixtures with one another. They are suitable for spin-dyeing and may also be used for mass-dyeing plastics.

Their use for dyeing and printing textile material of linear polyesters is of special technical interest. To achieve full dyeings on polyester fibers, for example on polyethylene terephthalate fibers, it is advantageous to treat the material to be dyed with a dye liquor containing the dye and dyeing auxiliaries, such as carriers, wetting agents and the like, at 100° C or under pressure at 130° to 140°C.

The invention is further illustrated by the following examples in which parts are by weight unless otherwise specified. The melting points are uncorrected.

EXAMPLE 1

50 parts of 1-amino-2-(4-chlorophenoxy)-4-hydroxyanthraquinone is introduced while stirring into a mixture consisting of 150 parts of butanediol-(1,4) and 6 parts of potassium hydroxide at 100°C. The reaction mixture is heated at 135°C for 2½ hours while a weak current of nitrogen is passed over the mixture. The reaction mixture is allowed to cool, 150 parts of methanol is added, and the whole is slightly acidified with acetic acid and allowed to stand for some hours. The dye is filtered off, washed with methanol and then with water until the wash water has a neutral reaction and dried. 41 parts of a dye having a melting point of 161° to 162°C (from butanol) is obtained which gives on polyglycol terephthalate cloth a red dyeing of good color strength and very good fastness properties.

EXAMPLE 2

By using the components set out in the following table instead of the initial substances in Example 1, and otherwise proceeding as described in Example 1, using the reaction temperature and heating period given in the table, further dyes are obtained which give red shades on polyester cloth.

TABLE

| Initial components | Conditions | Yield and melting point |
|---|---|---|
| 1. 50 parts 1-amino-2-(4-chlorophenoxy)-4-hydroxy-anthraquinone 130 parts hexanediol-(1,6) 10 parts potassium hydroxide | 4 hours 140°C | 42 parts 157°–158°C (from butanol) |
| 2. 30 parts 1-amino-2-bromo-4-hydroxyanthraquinone 30 parts phenol 80 parts hexanediol-(1,6) 12 parts potassium hydroxide | 5 hours 140°–145°C | 24 parts 156°–157°C (from toluene) This dye is identical with No. 1 in the Table |
| 3. 25 parts 1-amino-2-methoxy-4-hydroxy-anthraquinone 100 parts hexanediol-(1,6) 3 parts potassium hydroxide | 8 hours 160°C | 25 parts 156°–158°C This dye is identical with 1 and 2 in the Table |
| 4. 60 parts 1-amino-2-(4-chlorophenoxy)-4-hydroxy-anthraquinone 240 parts 2,2-dimethyl-propanediol-(1,3) 10 parts potassium hydroxide | 5 hours 145°C | 47 parts 214°–215°C (from butanol) |
| 5. 27 parts 1-amino-2-methoxy-4-hydroxyanthraquinone 100 parts 2,2-diethylpropanediol-(1,3) 3 parts potassium hydroxide | 8 hours 160°C | 30 parts 146°–148°C (from xylene) |
| 6. 30 parts 1-amino-2-(4-chlorophenoxy)-4-hydroxy-anthraquinone 100 parts 2,2-diethyl-propanediol-(1,3) 3 parts potassium hydroxide | 8 hours 160°C | 24 parts 145°–147°C (from xylene) This dye is identical with 5 in the Table |
| 7. 30 parts 1-amino-2-(4-chlorophenoxy)-4-hydroxy-anthraquinone 100 parts 2-ethyl-2-butyl-propanediol-(1,3) 3 parts potassium hydroxide | 8 hours 160°C | 25 parts 108°–109°C (from benzene) |
| 8. 27 parts 1-amino-2-methoxy-4-hydroxyanthraquinone 100 parts 2-ethyl-2-butyl-propanediol-(1,3) 3 parts potassium hydroxide | 8 hours 160°C | 29 parts 108°–109°C (from benzene) This dye is identical with No. 7 in the Table |

EXAMPLE 3

2 parts of potassium is dissolved in 50 parts of boiling tertiary butanol. 100 parts of hexanediol-(1,6) and 30 parts of 1-amino-2-(4-chlorophenoxy)-4-hydroxyanthraquinone are introduced into the resulting solution. The reaction mixture is heated for 8 hours at 150°C, while a weak current of nitrogen is passed over the mixture and is then worked up as described in Example 1. A dye having the melting point 156° to 157°C (from butanol) is obtained which is identical with dyes Nos. 1, 2 and 3 of the above table in Example 2.

EXAMPLE 4

All the water is distilled off from a mixture of 3 parts of potassium hydroxide and 100 parts of 2,2-di-methylhexanediol-(1,3) by heating it to 110° to 115°C while stirring. Then 30 parts of 1-amino-2-(4-chloro-phenoxy)-4-hydroxyanthraquinone is introduced into this mixture. The reaction mixture is heated for 8 hours at 150°C and then worked up as described in Example 1, residual amounts of dye being recovered from the mother liquor by steam distillation of the filtrate.

27.5 parts of a dye having the melting point 160° to 161°C (from ethanol, propanol) is obtained. Red dyeings having good fastness properties and good color strength are obtained therewith on polyester fibers.

EXAMPLE 5

All the water is distilled off from a mixture of 3 parts of potassium hydroxide and 100 parts of 2,2,4-trimethylpentanediol-(1,3) by heating to 110° to 115°C while stirring. Then 30 parts of 1-amino-2-(4-chloro-phenoxy)-4-hydroxyanthraquinone is introduced into this mixture. The reaction mixture is heated for eight hours at 160°C and then worked up as described in Example 1. 31.5 parts of a dye having a melting point of 181° to 182.5°C (from alcohol, benzene) is obtained which gives red dyeings of good color strength and good fastness properties on polyester fibers.

EXAMPLE 6

27 parts of 1,4-diamino-2-methoxyanthraquinone is introduced into a mixture of 3 parts of potassium hydroxide and 100 parts of 2-ethyl-2-butylpropanediol-(1,3). The reaction mixture is heated for 8 hours at 170°C, a weak current of nitrogen being passed over the mixture at the same time. The reaction mixture is worked up as described in Example 1. A dye having a melting point of 147° to 148°C (from benzene) is obtained which gives claret dyeings having good fastness properties on polyester fibers.

EXAMPLE 7

All the water is distilled off from a mixture of 90 parts of hexanediol-(1,6) and 8 parts of potassium hydroxide by heating to 110° to 120° C while stirring. Then 25 parts of 1,4-diaminoanthraquinone-2-sulfonic acid is introduced into this mixture at 100° C. The mixture is heated for 4 hours at 150°C under nitrogen and then allowed to cool. Water is added and the whole acidified with acetic acid. The reaction product is filtered off, washed with hot water and dried. A dye having a melting point of 218° to 220° C (from butanol, anisol) is obtained which gives claret dyeings having good fastness properties on polyester fibers.

EXAMPLE 8

100 parts of a polyethylene terephthalate cloth is introduced at 40°C into a dye liquor consisting of 3,000 parts of water, 3 parts of 30 percent acetic acid, 2 parts of the sulfonated reaction product of 1 mole of sperm oil alcohol and 80 moles of ethylene oxide and 1 part of the dye obtainable according to Example 3. The dye liquor is heated to 135°C within 30 minutes. At this temperature the cloth is dyed for 60 minutes. The dyed cloth is washed with water and then dried. A red dyeing of good color strength and very good fastness properties is obtained.

I claim:

1. A dye of the formula

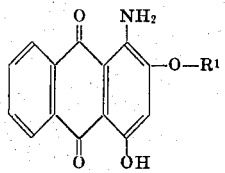

where $R^1$ represents hydroxyalkyl containing from five to nine carbon atoms.

2. The dye of the formula

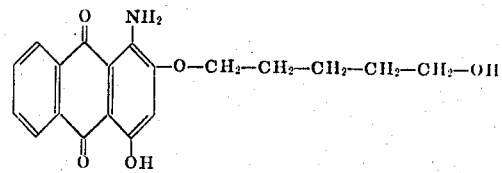

3. The dye of the formula

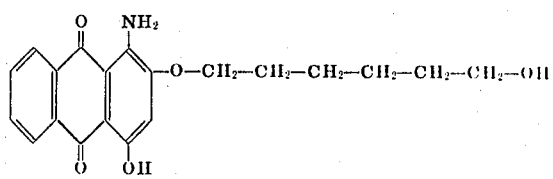

4. The dye of the formula

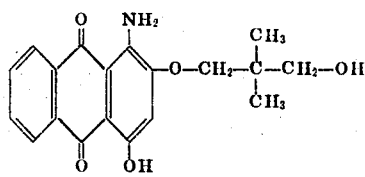

* * * * *